US011175385B2

(12) United States Patent
Wang et al.

(10) Patent No.: US 11,175,385 B2
(45) Date of Patent: Nov. 16, 2021

(54) LIGHT DETECTION AND RANGING (LIDAR) SYSTEM USING A WAVELENGTH CONVERTER

(71) Applicant: BEIJING VOYAGER TECHNOLOGY CO., LTD., Beijing (CN)

(72) Inventors: Chao Wang, Milpitas, CA (US); Youmin Wang, Berkeley, CA (US); Yue Lu, Los Gatos, CA (US); Lingkai Kong, Palo Alto, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 635 days.

(21) Appl. No.: 16/103,922

(22) Filed: Aug. 14, 2018

(65) Prior Publication Data

US 2020/0057142 A1 Feb. 20, 2020

(51) Int. Cl.
*G01C 3/08* (2006.01)
*G01S 7/484* (2006.01)
(Continued)

(52) U.S. Cl.
CPC ............ *G01S 7/484* (2013.01); *G01S 7/4815* (2013.01); *G02F 1/353* (2013.01); *G02F 1/3551* (2013.01);
(Continued)

(58) Field of Classification Search
CPC .... G02F 2201/02; G02F 1/3551; G02F 1/353; G02F 1/37; G02F 1/354; H01S 3/067;
(Continued)

(56) References Cited

U.S. PATENT DOCUMENTS 5,059,787 A * 10/1991 Lou ..................... H01L 31/103
257/436
2006/0013270 A1* 1/2006 Yumoto ................. G01N 21/39
372/21
(Continued)

FOREIGN PATENT DOCUMENTS

CN 104459670 A 3/2015
JP 2014173966 A * 9/2014 ............ G01S 7/484
JP 02018159896 A * 10/2018 ............... G02F 1/37

OTHER PUBLICATIONS

International Search Report issued in corresponding International Application No. PCT/US2018/067568, dated Apr. 26, 2019, 3 pages.
(Continued)

*Primary Examiner* — Mark Hellner
(74) *Attorney, Agent, or Firm* — Bayes PLLC

(57) ABSTRACT

Embodiments of the disclosure provide an apparatus for emitting laser light and a system and method for detecting laser light returned from an object. The system includes a transmitter and a receiver. The transmitter includes one or more laser sources, at least one of the laser sources configured to provide a respective native laser beam having a wavelength above 1,100 nm. The transmitter also includes a wavelength converter configured to receive the native laser beams provided by the laser sources and convert the native laser beams into a converted laser beam having a wavelength below 1,100 nm. The transmitter further includes a scanner configured to emit the converted laser beam to the object in a first direction. The receiver is configured to detect a returned laser beam having a wavelength below 1,100 nm and returned from the object in a second direction.

18 Claims, 5 Drawing Sheets

(51) Int. Cl.
  *H01S 3/23* (2006.01)
  *H01S 3/00* (2006.01)
  *G02F 1/35* (2006.01)
  *G02F 1/355* (2006.01)
  *G02F 1/37* (2006.01)
  *G01S 7/481* (2006.01)
  *H01S 3/067* (2006.01)

(52) U.S. Cl.
  CPC .............. *G02F 1/37* (2013.01); *H01S 3/0092* (2013.01); *H01S 3/067* (2013.01); *H01S 3/2391* (2013.01); *G02F 1/354* (2021.01); *G02F 2201/02* (2013.01)

(58) Field of Classification Search
  CPC .... H01S 3/2391; H01S 3/2375; H01S 3/0092; G01S 7/4815; G01S 7/484; G01S 7/4817; G01S 17/894
  See application file for complete search history.

(56) References Cited

U.S. PATENT DOCUMENTS

| | | | |
|---|---|---|---|
| 2006/0153254 A1* | 7/2006 | Franjic | ................... B23K 26/38 372/30 |
| 2012/0213513 A1 | 8/2012 | Chao | |
| 2013/0087692 A1 | 4/2013 | Woodward et al. | |
| 2015/0219765 A1* | 8/2015 | Mead | .................. H01S 3/06754 356/5.09 |
| 2016/0291137 A1 | 10/2016 | Sakimura et al. | |

OTHER PUBLICATIONS

Written Opinion of the International Searching Authority issued in corresponding International Application No. PCT/US2018/067568, dated Apr. 26, 2019, 6 pages.

* cited by examiner

500

Set, by a temperature controller, a temperature of a nonlinear optical material based on the wavelength of the converted laser beam
S502

Perform, by the nonlinear optical material, optical frequency mixing of the native laser beams
S504

LIGHT DETECTION AND RANGING (LIDAR) SYSTEM USING A WAVELENGTH CONVERTER

TECHNICAL FIELD

The present disclosure relates to a Light Detection and Ranging (LiDAR) system, and more particularly to, a LiDAR system using a wavelength converter and method operating the same.

BACKGROUND

LiDAR systems have been widely used in autonomous driving and producing high-definition maps. For example, LiDAR systems measure distance to a target by illuminating the target with pulsed laser light and measuring the reflected pulses with a sensor. Differences in laser return times and wavelengths can then be used to make digital three-dimensional (3-D) representations of the target. The laser light used for LiDAR scan may be ultraviolet, visible, or near infrared. Because a narrow laser beam as the incident light from the scanner can map physical features with very high resolution, a LiDAR system is particularly suitable for applications such as high-definition map surveys.

However, in current LiDAR systems, the practical wavelength of the light emitter is limited by available laser sources, photo detectors, system performance and laser safety requirements. The diode laser source which can provide wavelength range from 750 nm to 1,100 nm either doesn't have enough power or doesn't have good beam quality in terms of collimation, especially when a small aperture is applied. Some other lasers, such as fiber laser, can provide better good beam quality and higher power. But the wavelength of fiber laser is normally above 1,100 nm, which cannot be detected by silicon-based photodetector. The receivers used for detecting laser beams having wavelengths above 1,100 nm, such as Ge/InGaAs-based photodetector, usually have high cost and unsatisfactory performance compared with silicon-based photodetector.

Embodiments of the disclosure address the above problems by an improved system for laser light emission and detection having a wavelength converter.

SUMMARY

Embodiments of the disclosure provide a system for detecting laser light returned from an object. The system includes a transmitter and a receiver. The transmitter includes one or more laser sources, at least one of the laser sources configured to provide a respective native laser beam having a wavelength above 1,100 nm. The transmitter also includes a wavelength converter configured to receive the native laser beams provided by the laser sources and convert the native laser beams into a converted laser beam having a wavelength below 1,100 nm. The transmitter further includes a scanner configured to emit the converted laser beam to the object in a first direction. The receiver is configured to detect a returned laser beam having a wavelength below 1,100 nm and returned from the object in a second direction.

Embodiments of the disclosure also provide a system for detecting laser light returned from an object. The system includes a transmitter and a silicon-based photodetector. The transmitter includes a plurality of fiber lasers, each configured to provide a respective native laser beam having a respective native wavelength. The transmitter also includes a wavelength converter configured to receive the native laser beams provided by the fiber lasers and convert the native laser beams into a converted laser beam having a converted wavelength below any one of the native wavelengths. The transmitter further includes a scanner configured to emit the converted laser beam to the object in a first direction. The silicon-based photodetector configured to detect a returned laser beam light having the converted wavelength and returned from the object in a second direction.

Embodiments of the disclosure also provide an apparatus for emitting laser light. The apparatus includes a plurality of fiber lasers, each configured to provide a respective native laser beam having a first wavelength. The apparatus also includes a wavelength converter configured to receive the native laser beams provided by the fiber lasers and convert the native laser beams into a converted laser beam having a second wavelength below the first wavelength. The apparatus further includes a scanner configured to emit the converted laser beam.

Embodiments of the disclosure further provide a method for detecting laser light returned from an object. The method includes providing, by a plurality of laser sources, a plurality of native laser beams each having a wavelength above 1,100 nm. The method also includes converting, by a wavelength converter, the native laser beams into a converted laser beam having a wavelength below 1,100 nm. The method further includes emitting, by a scanner, the converted laser beam to the object in a first direction. The method still further includes detecting, by a receiver, a returned laser beam having a wavelength below 1,100 nm and returned from the object in a second direction, It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
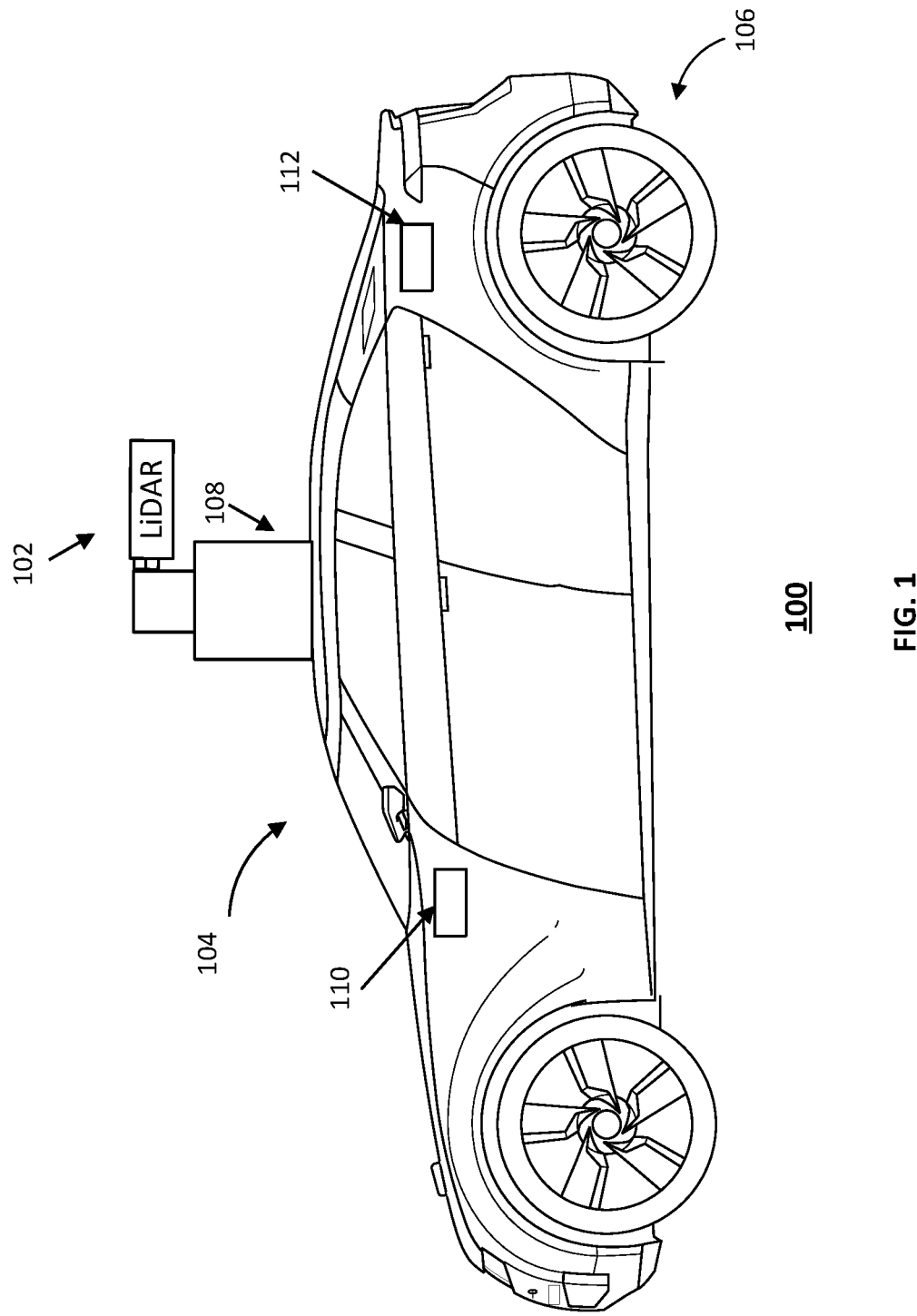
FIG. 1 illustrates a schematic diagram of an exemplary vehicle equipped with a LiDAR system, according to embodiments of the disclosure.

FIG. 1 illustrates a schematic diagram of an exemplary vehicle 100 equipped with a LiDAR system 102, according to embodiments of the disclosure. Consistent with some embodiments, vehicle 100 may be a survey vehicle configured for acquiring data for constructing a high-definition map or 3-D buildings and city modeling. It is contemplated that vehicle 100 may be an electric vehicle, a fuel cell vehicle, a hybrid vehicle, or a conventional internal combustion engine vehicle. Vehicle 100 may have a body 104 and at least one wheel 106. Body 104 may be any body style, such as a sports vehicle, a coupe, a sedan, a pick-up truck, a station wagon, a sports utility vehicle (SUV), a minivan, or a conversion van. In some embodiments of the present disclosure, vehicle 100 may include a pair of front wheels and a pair of rear wheels, as illustrated in FIG. 1. However, it is contemplated that vehicle 100 may have less wheels or equivalent structures that enable vehicle 100 to move around. Vehicle 100 may be configured to be all wheel drive (AWD), front wheel drive (FWR), or rear wheel drive (RWD). In some embodiments of the present disclosure, vehicle 100 may be configured to be operated by an operator occupying the vehicle, remotely controlled, and/or autonomous.

As illustrated in FIG. 1, vehicle 100 may be equipped with LiDAR system 102 mounted to body 104 via a mounting structure 108. Mounting structure 108 may be an electromechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3-D sensing performance.

Consistent with some embodiments, LiDAR system 102 and sensor 110 may be configured to capture data as vehicle 100 moves along a trajectory. For example, a transmitter of LiDAR system 102 is configured to scan the surrounding and acquire point clouds. LiDAR system 102 measures distance to a target by illuminating the target with pulsed laser light and measuring the reflected pulses with a receiver. The laser light used for LiDAR system 102 may be ultraviolet, visible, or near infrared. In some embodiments of the present disclosure, LiDAR system 102 may capture point clouds. As vehicle 100 moves along the trajectory, LiDAR system 102 may continuously capture data. Each set of scene data captured at a certain time range is known as a data frame.

As illustrated in FIG. 1, vehicle 100 may be additionally equipped with sensor 110, which may include sensors used in a navigation unit, such as a Global Positioning System (GPS) receiver and one or more Inertial Measurement Unit (IMU) sensors. By combining the GPS receiver and the IMU sensor, sensor 110 can provide real-time pose information of vehicle 100 as it travels, including the positions and orientations (e.g., Euler angles) of vehicle 100 at each time stamp. In some embodiments of the present disclosure, pose information may be used for calibration and/or pretreatment of the point cloud data captured by LiDAR system 102.

Consistent with the present disclosure, vehicle 100 may include a local controller 112 inside body 104 of vehicle 100 or communicate with a remote computing device, such as a server, (not illustrated in FIG. 1) for controlling the operations of LiDAR system 102 and sensor 110. In some embodiments of the present disclosure, controller 112 may have different modules in a single device, such as an integrated circuit (IC) chip (implemented as an application-specific integrated circuit (ASIC) or a field-programmable gate array (FPGA)), or separate devices with dedicated functions. In some embodiments of the present disclosure, one or more components of controller 112 may be located inside vehicle 100 or may be alternatively in a mobile device, in the cloud, or another remote location. Components of controller 112 may be in an integrated device or distributed at different locations but communicate with each other through a network (not shown).

Figure 2:
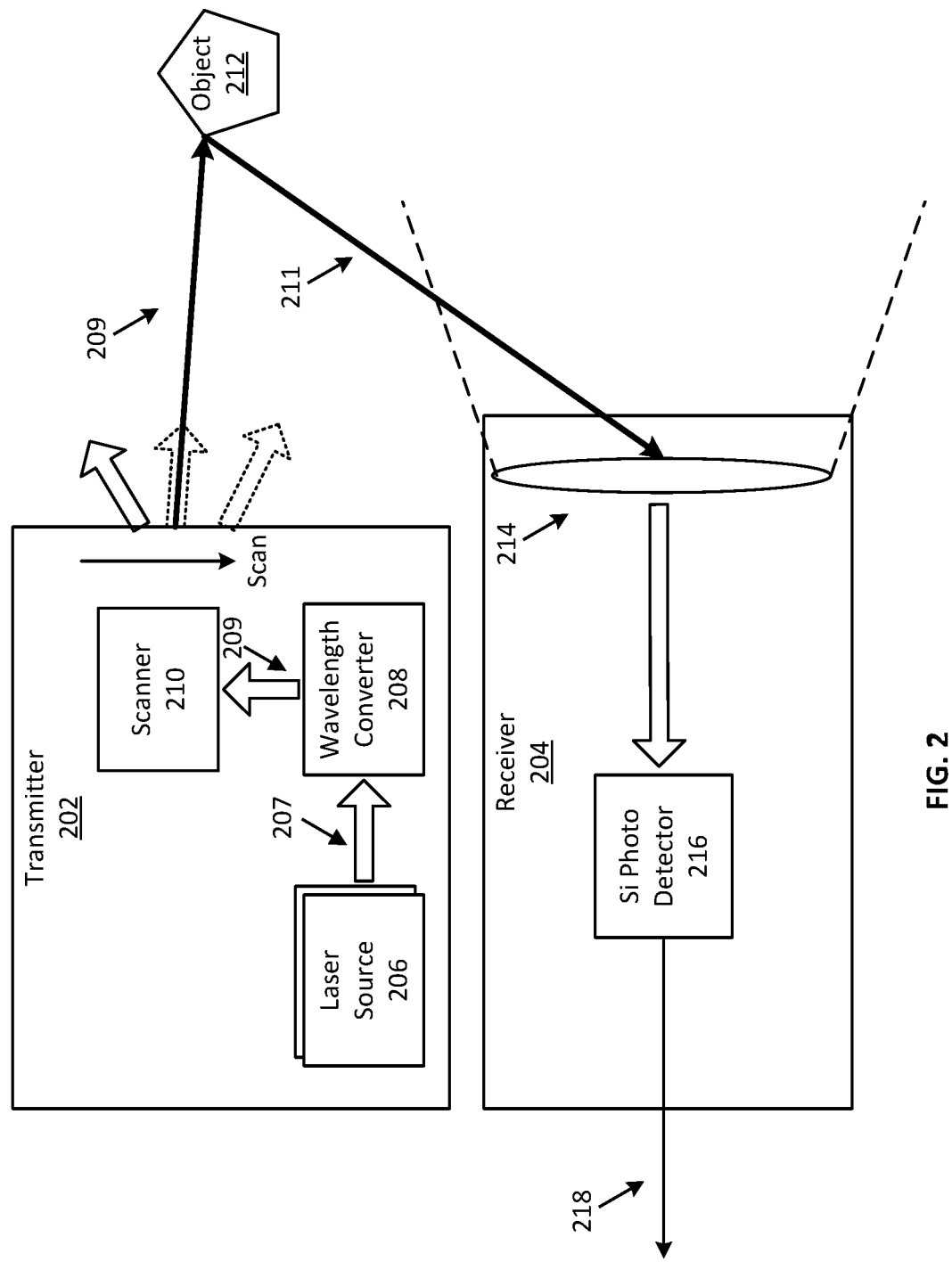
FIG. 2 illustrates a block diagram of an exemplary LiDAR system using a wavelength converter, according to embodiments of the disclosure.

FIG. 2 illustrates a block diagram of an exemplary LiDAR system 102 using a wavelength converter 208, according to embodiments of the disclosure. LiDAR system 102 may include a transmitter 202 and a receiver 204. Transmitter 202 may emit laser beams within a scan angle. Transmitter 202 may include one or more laser sources 206, wavelength converter 208, and a scanner 210. Consistent with the disclosure of the present application, wavelength converter 208 can be included in transmitter 202 to convert the laser beams of wavelength above 1,100 nm to become a laser beam of wavelength under 1,100 nm.

Using wavelength converter 208 enables LiDAR system 102 to use high power, low divergence laser sources with silicon-based photo detector. For example, this conversion can enable the detection capability with a silicon-based photodetector 216 in receiver 204, which has a low cost and improved performance compared with other types of photodetectors, such as Ge/InGaAs-based photodetector. On the other hand, with the conversion, laser sources 206 used in transmitter 202 can be high power, low divergence laser sources (even with wavelength above 1,100 nm), such as fiber lasers, thereby improving the output laser light quality and power. In some embodiments of the present disclosure, wavelength converter 208 is adaptive to various combinations of input native laser beam number and wavelength and thus, makes the output converted laser beam wavelength tunable.

As part of LiDAR system 102, transmitter 202 can emit a stream of pulsed laser beams in different directions within its scan angle, as illustrated in FIG. 2. Laser sources 206 may be configured to provide laser light including one or more laser beams 207 (referred to herein as "native laser beams") to wavelength converter 208. In some embodiments of the present disclosure, each laser source 206 may generate a pulsed laser beam in the ultraviolet, visible, or near infrared wavelength range. In some embodiments of the present disclosure, transmitter 202 includes at least two laser sources 206, at least one of which is a fiber laser. Fiber laser may be a laser in which the active gain medium is an optical fiber doped with rare-earth elements, such as erbium (Er), ytterbium (Yb), neodymium (Nd), dysprosium (Dy), praseodymium (Pr), thulium (Tm), and holmium (Ho). Fiber lasers can have a high output power and high optical gain, such as having several kilometers long active regions, because of fiber's high surface area to volume ratio, which allows efficient cooling. Fiber lasers can also have high optical quality because fiber's waveguiding properties reduce or eliminate thermal distortion of the optical path, typically producing a diffraction-limited, high-quality laser beam. Depending on the doped rare-earth elements, the wavelength of a laser beam provided by a fiber laser may be above 1,100 nm, such as 1,047 nm, 1,053 nm, 1,062 nm, 1,064 nm, 1,320 nm, 1,550 nm, between 1,570 nm and 1,600 nm, or between 1,750 nm and 2,100 nm.

In some embodiments of the present disclosure, multiple laser sources 206 may include at least one fiber laser. In some embodiments, multiple laser sources 206 may further include one or more diode lasers. Diode laser may be a semiconductor device similar to a light-emitting diode (LED) in which the laser beam is created at the diode's junction. In some embodiments of the present disclosure, a diode laser includes a PIN diode in which the active region is in the intrinsic (I) region, and the carriers (electrons and holes) are pumped into the active region from the N and P regions, respectively. Depending on the semiconductor materials, the wavelength of a laser beam provided by a diode layer may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, or 848 nm.

In some embodiments of the present disclosure, no more than 3 laser sources 206 are used to maintain high wavelength conversion efficiency. In one example, transmitter 202 includes two laser sources 206, for example, two fiber lasers, or one fiber laser and one diode laser. In another example, transmitter 202 includes three laser sources 206, for example, three fiber lasers, two fiber lasers and one diode laser, or one fiber laser and two diode lasers. It is contemplated that the number of laser sources 206 may also be larger than 3 in some embodiments depending on the design. Consistent with the disclosure of the present application, regardless of the number of laser sources 206, at least one of laser sources 206 is a fiber laser configured to provide native laser beam 207 having a wavelength above 1,100 nm. In some embodiments of the present disclosure, all laser sources 206 (e.g., two, three or more) are fiber lasers each configured to provide native laser beam 207 having a wavelength above 1,100 nm.

Wavelength converter 208 may be configured to receive the native laser beams provided by laser sources 206 and convert native laser beams 207 into a converted laser beam 209 having a wavelength below 1,100 nm. In some embodiments of the present disclosure, at least one laser source 206 is a fiber laser configured to provide native laser beam 207 having a wavelength above 1,100 nm, and wavelength converter 208 converts native laser beams 207 into converted laser beam 209 having a wavelength below any individual wavelength of native laser beams 207 (referred to herein as "native wavelengths").

Figure 3:
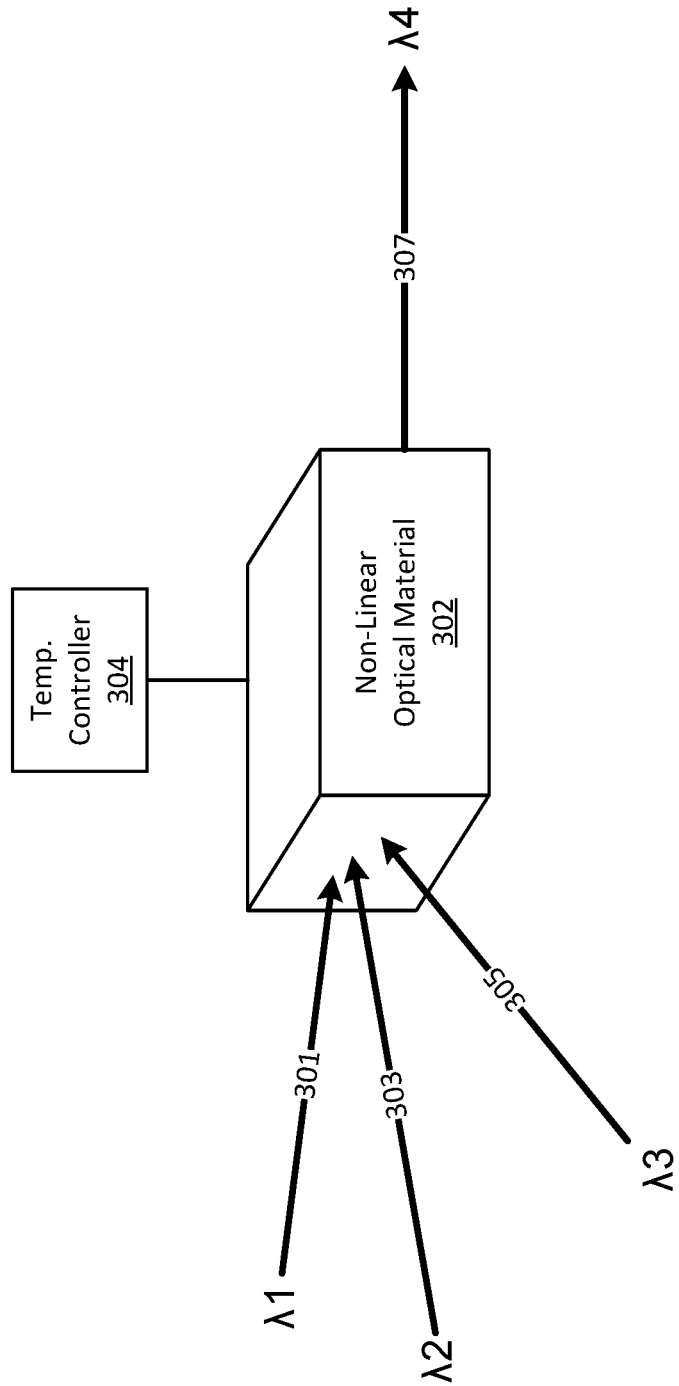
FIG. 3 illustrates a block diagram of an exemplary wavelength converter, according to embodiments of the disclosure.

For example, FIG. 3 illustrates a block diagram of exemplary wavelength converter 208, according to embodiments of the disclosure. Wavelength converter 208 may include a nonlinear optical material 302 and a temperature controller 304 coupled to nonlinear optical material 302. Nonlinear optical material 302 may be configured to perform optical frequency mixing of native laser beams 301, 303, and 305 (e.g., examples of native laser beams 207) having wavelengths of $\lambda 1$, $\lambda 2$, and $\lambda 3$, respectively and output a converted laser beam 307 (an example of converted laser beam 209) having a wavelength of $\lambda 4$. Nonlinear optical material 302 is a material that exhibits a nonlinear response of properties such as wavelength, polarization, phase, or path of incident light. The optical properties of nonlinear optical material 302 may be dependent on the degree of charge separation (polarization) induced by light. Nonlinear optical material 302 can change the wavelength of light passing through it, depending upon orientation, temperature, input light wavelength, etc. Optical frequency mixing processes that can be performed by nonlinear optical material 302 include, but are not limited to, second-harmonic generation (SHG)/frequency doubling, third-harmonic generation (THG), high-harmonic generation (HHG), sum-frequency generation (SFG), difference-frequency generation (DFG), optical parametric amplification (OPA), optical parametric oscillation (OPO), optical parametric generation (OPG), spontaneous parametric down-conversion (SPDC), and optical rectification (OR).

Nonlinear optical material 302 may include any suitable materials, such as organic nonlinear optical materials (e.g., 2-Aminofluorene, 2-Amino-3-nitropyridine, 2-Amino-5-nitropyridine, 2-Chloro-3,5-dinitropyridine, 2-Chloro-4-nitroaniline, Crystal Violet, N,N'-Dimethylurea, Ethyl 4-dimethylaminobenzoate, N-Methyl-4-nitroaniline, 2-Methyl-4-nitroaniline, 3-Methyl-4-nitroaniline, Nile Blue, 2-Nitroaniline, 3-Nitroaniline, 4-Nitroaniline, 5-Nitroindole, 4-Nitro-3-picoline N-oxide, 5-Nitrouracil, 7,7,8,8-Tetracyanoquinodimethane, and 2-Vinylnaphthalene) or inorganic nonlinear optical materials (e.g., Ammonium dihydrogen phosphate, Barium metaborate, Cesium dihydrogen arsenate, Lithium niobium oxide, Potassium dihydrogen phosphate, Potassium niobium oxide, Sodium 1-decanesulfonate, and Lithium niobium oxide). In some embodiments of the present disclosure, nonlinear optical material 302 includes a nonlinear optical crystal, such as Lithium Triborate (LBO), Beta Barium Borate (BBO), Potassium Titanyl Phosphate (KTP), Potassium Dihydrogen Phosphate & Potassium Dideuterium Phosphate (KDP & DKDP), Lithium Iodate (LiIO3), Lithium Niobate (LiNbO3), and infrared nonlinear optical crystals (AgGaS2, AgGaSe2, GaSe, ZnGeP2).

Temperature controller 304 may be configured to set the temperature of nonlinear optical material 302 based on the wavelength $\lambda 4$ of converted laser beam 307. The nonlinear response of nonlinear optical material 302 with respect to the wavelength $\lambda 4$ of converted laser beam 307 may be affected by the temperature of nonlinear optical material 302. In some embodiments of the present disclosure, the orientation of nonlinear optical material 302, e.g., the plane receiving laser beams 301, 303, and/or 305 may be adjusted based on the wavelength $\lambda 4$ of converted laser beam 307 as well. In some embodiments of the present disclosure, temperature controller 304 may be part of controller 112 of vehicle 100 or controlled by controller 112.

In some embodiments of the present disclosure, the wavelength $\lambda 4$ of converted laser beam 307 is determined based on the wavelengths $\lambda 1$, $\lambda 2$, and $\lambda 3$ of native laser beams 301, 303, and 305, respectively using the following Equation (1):

$$\frac{1}{\lambda_4} = \frac{1}{\lambda_1} + \frac{1}{\lambda_2} + \frac{1}{\lambda_3}. \tag{1}$$

In some embodiments of the present disclosure, all of $\lambda 1$, $\lambda 2$, and $\lambda 3$ have a positive value. In some embodiments of the present disclosure, at least one of $\lambda 1$, $\lambda 2$, and $\lambda 3$ has a negative weight. In one example, one of $\lambda 1$, $\lambda 2$, and $\lambda 3$ has a negative value, such as $\lambda 3$, so that Equation (1) becomes, for example, $$\frac{1}{\lambda_4} = \frac{1}{\lambda_1} + \frac{1}{\lambda_2} - \frac{1}{\lambda_3}.$$

In another example, two of $\lambda 1$, $\lambda 2$, and $\lambda 3$ has a negative value, such as $\lambda 2$ and $\lambda 3$, so that Equation (1) becomes, for example, $$\frac{1}{\lambda_4} = \frac{1}{\lambda_1} - \frac{1}{\lambda_2} - \frac{1}{\lambda_3}.$$

As described above, optical frequency mixing processes that can be performed by nonlinear optical material 302 are not limited by Equation (1) and can include any suitable frequency mixing processes. In some embodiments, the laser sources include two laser sources providing two native laser beams, respectively, and the wavelength of the converted laser beam is determined using the following Equation (2):

$$\frac{1}{\lambda_3} = \frac{1}{\lambda_1} + \frac{1}{\lambda_2}, \quad (2)$$

where λ3 represents the wavelength of the converted laser beam, and λ1 and λ2 each represents a respective wavelength of the two native laser beams. In some embodiments, optical frequency mixing processes include SHG. For example, the laser sources include one laser source providing one native laser beam, and the wavelength of the converted laser beam is half of a wavelength of the native laser beam. In some embodiments, optical frequency mixing processes include THG. For example, the laser sources include one laser source providing one native laser beam, and the wavelength of the converted laser beam is a third of a wavelength of the native laser beam.

Referring back to FIG. 2, scanner 210 may be configured to emit converted laser beam 209 to an object 212 in a first direction. Scanner 210 may scan object 212 using converted laser beam 209 whose wavelength is converted by wavelength converter 208 (e.g., under 1,100 nm) within a scan angle at a scan rate. Object 212 may be made of a wide range of materials including, for example, non-metallic objects, rocks, rain, chemical compounds, aerosols, clouds and even single molecules. The wavelength of converted laser beam 209 may vary based on the composition of object 212. At each time point during the scan, scanner 210 may emit converted laser beam 209 (incident laser light) to object 212 in a direction (incident direction) within the scan angle. In some embodiments of the present disclosure, scanner 210 may also include optical components (e.g., lenses, mirrors) that can focus pulsed laser light into a narrow laser beam to increase the scan resolution and range of object 212.

As part of LiDAR system 102, receiver 204 may be configured to detect a returned laser beam 211 returned from object 212 in a second direction. Receiver 204 can collect laser beams returned from object 212 and output electrical signal reflecting the intensity of the returned laser beams. Upon contact, laser light can be reflected by object 212 via backscattering, such as Rayleigh scattering, Mie scattering, Raman scattering, and fluorescence. As illustrated in FIG. 2, receiver 204 may include a lens 214 and a silicon-based photodetector 216. Lens 214 be configured to collect light from a respective direction in its field of view (FOV). At each time point during the scan, a returned laser beam 211 may be collected by lens 214. Returned laser beam 211 may be returned from object 212 and have the same wavelength as converted laser beam 209 (e.g., below 1,100 nm).

Silicon-based photodetector 216 may be configured to detect returned laser beam 211 returned from object 212 in a second direction. Silicon-based photodetector 216 may convert the laser light (e.g., returned laser beam 211) collected by lens 214 into an electrical signal 218 (e.g., a current or a voltage signal). The current is generated when photons are absorbed in the photodiode. Silicon-based photodetector 216 may include silicon PIN photodiodes that utilize the photovoltaic effect to convert optical power into an electrical current. In some embodiments of the present disclosure, the wavelength of laser beams that can be detected by silicon-based photodetector 216 is below 1,100 nm, such as between 190 nm and 1,100 nm. In other words, silicon-based photodetector 216 may not directly detect native laser beam 207 provided by laser source 206 having a native wavelength above 1,100 nm, such as by a fiber laser. Converted laser beam 209 (and returned laser beam 211) having a converted wavelength below 1,100 nm, however, can be readily detected by silicon-based photodetector 216.

Figure 4:
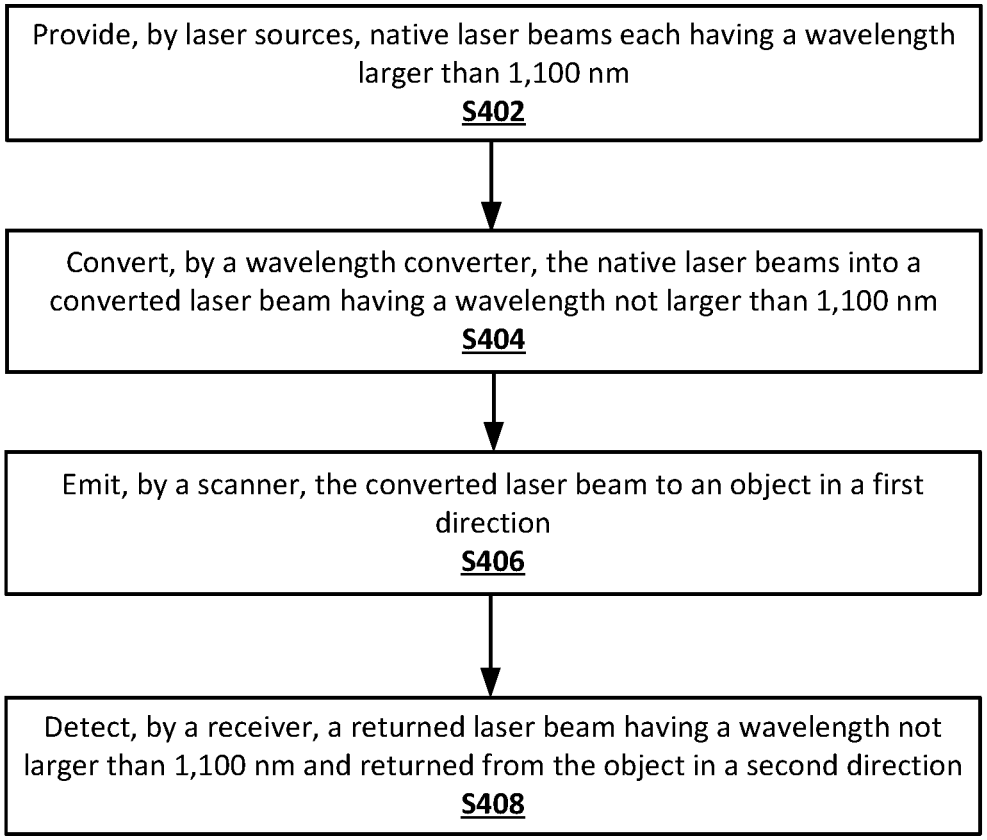
FIG. 4 illustrates a flowchart of an exemplary method for detecting laser light returned from an object, according to embodiments of the disclosure.

FIG. 4 illustrates a flowchart of an exemplary method for detecting laser light returned from an object, according to embodiments of the disclosure. For example, method 400 may be implemented by LiDAR system 102 in FIGS. 1-2. However, method 400 is not limited to that exemplary embodiment. Method 400 may include steps S402-S408 as described below. It is to be appreciated that some of the steps may be optional to perform the disclosure provided herein. Further, some of the steps may be performed simultaneously, or in a different order than shown in FIG. 4.

In step S402, native laser beams 207 may be provided, by laser sources 206, at least one having a wavelength above 1,100 nm (native wavelength that has not been converted). Each native laser beam 207 may be a pulsed laser beam in the ultraviolet, visible, or near infrared wavelength range. In some embodiments of the present disclosure, at least one of laser sources 206 is a fiber laser. In one example, each laser source 206 is a fiber laser. In another example, laser sources 206 include one or more fiber lasers and one or more diode lasers. Depending on the doped rare-earth elements, the wavelength of native laser beam 207 provided by a fiber laser may be above 1,100 nm, such as 1,047 nm, 1,053 nm, 1,062 nm, 1,064 nm, 1,320 nm, 1,550 nm, between 1,570 nm and 1,600 nm, or between 1,750 nm and 2,100 nm. In some embodiments of the present disclosure, the number of laser sources 206 is not larger than 3, such as 2 or 3.

Figure 5:
FIG. 5 illustrates a flowchart of an exemplary method for converting laser beam wavelength, according to embodiments of the disclosure.

In step S404, native laser beams 207 may be converted, by wavelength converter 208, into converted laser beam 209 having a converted wavelength below 1,100 nm. In some embodiments of the present disclosure, the converted wavelength is determined based on the native wavelengths of three laser sources according to Equation (1) disclosed above. FIG. 5 illustrates a flowchart of an exemplary method 500 for converting laser beam wavelength, according to embodiments of the disclosure. Step S404 may be implemented using method 500. Method 500 may include steps S502-S504 as described below. It is to be appreciated that some of the steps may be optional to perform the disclosure provided herein. Further, some of the steps may be performed simultaneously, or in a different order than shown in FIG. 5.

In step S502, a temperature of nonlinear optical material 302 may be set, by temperature controller 304, based on the wavelength of converted laser beam 209. The nonlinear response of nonlinear optical material 302 with respect to the wavelength of converted laser beam 307 may be affected by the temperature of nonlinear optical material 302. In some embodiments of the present disclosure, the orientation of nonlinear optical material 302, e.g., the plane receiving laser beams 301, 303, and/or 305 may be adjusted based on the wavelength of converted laser beam 307 as well.

In step S504, optical frequency mixing of native laser beams 207 may be performed by nonlinear optical material 302. In some embodiments of the present disclosure, nonlinear optical material 302 includes a nonlinear optical crystal, such as LBO, BBO, KTP, KDP & DKDP, LiIO3, LiNbO3, and infrared nonlinear optical crystals (AgGaS2, AgGaSe2, GaSe, ZnGeP2). In some embodiments of the present disclosure, optical frequency mixing processes include, but are not limited to, SHG/frequency doubling, THG, HHG, SFG, DFG, OPA, OPO, OPG, SPDC, and OR.

Referring back to FIG. 4, in step S406, converted laser beam 209 may be emitted, by scanner 210, to object 212 in a first direction (e.g., incident direction). Object 212 may be any target in the surrounding scene of LiDAR system 102. In some embodiments of the present disclosure, converted laser beam 209 may be emitted within a scan angle at a scan rate as scanner 210 moves, and the first direction may be determined based on the position of scanner 210.

In step S408, returned laser beam 211 having a wavelength below 1,100 nm and returned from object 212 in a second direction (e.g., return direction) may be detected by receiver 204. The wavelength of returned laser beam 211 may be the same as the converted wavelength (e.g., below 1,100 nm). Receiver 204 may include silicon-based photodetector 216 configured to convert a light signal into an electrical signal. In some embodiments of the present disclosure, silicon-based photodetector 216 is capable of detecting laser beams having wavelengths below 1,100 nm, such as between 190 nm and 1,100 nm.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for detecting laser light returned from an object, comprising:
    a transmitter comprising:
        one or more laser sources, at least one of the laser sources configured to provide a respective native laser beam having a wavelength above 1,100 nm;
        a wavelength converter configured to receive the native laser beams provided by the laser sources and convert the native laser beams into a converted laser beam having a wavelength below 1,100 nm; and
        a scanner configured to emit the converted laser beam to the object in a first direction; and
    a receiver configured to detect a returned laser beam having a wavelength below 1,100 nm and returned from the object in a second direction,
        wherein when the laser sources include two laser sources providing two native laser beams, respectively, the wavelength of the converted laser beam is determined by $$\frac{1}{\lambda_3} = \frac{1}{\lambda_2} + \frac{1}{\lambda_1}$$

where $\lambda_3$ represents the wavelength of the converted laser beam, and $\lambda_1$ and $\lambda_2$ each represents a respective wavelength of the two native laser beams.

2. The system of claim 1, wherein at least one of the laser sources is a fiber laser.

3. The system of claim 2, wherein each of the laser sources is a fiber laser.

4. The system of claim 3, wherein the receiver includes a silicon-based photodetector.

5. The system of claim 3, wherein the wavelength converter comprises:
    a nonlinear optical material configured to perform optical frequency mixing of the native laser beams; and
    a temperature controller configured to set a temperature of the nonlinear optical material based on the wavelength of the converted laser beam.

6. The system of claim 5, wherein the nonlinear optical material includes a nonlinear optical crystal.

7. The system of claim 1, wherein a number of the laser sources is not larger than 3.

8. The system of claim 7, wherein when the laser sources include three laser sources providing three native laser beams, respectively, the wavelength of the converted laser beam is determined by $$\frac{1}{\lambda_4} = \frac{1}{\lambda_3} + \frac{1}{\lambda_2} + \frac{1}{\lambda_1}$$

where $\lambda_4$ represents the wavelength of the converted laser beam, and $\lambda_1$, $\lambda_2$, and $\lambda_3$ each represents a respective wavelength of the three native laser beams.

9. The system of claim 8, wherein at least one of $\lambda_1$, $\lambda_2$, and $\lambda_3$ has a negative weight.

10. The system of claim 9, wherein one of $\lambda_1$, $\lambda_2$, and $\lambda_3$ has a negative weight.

11. The system of claim 1, wherein the laser sources include one laser source providing one native laser beam, and the wavelength of the converted laser beam is half of a wavelength of the native laser beam.

12. The system of claim 1, wherein the laser sources include one laser source providing one native laser beam, and the wavelength of the converted laser beam is a third of a wavelength of the native laser beam.

13. An apparatus for emitting laser light, comprising:
    a plurality of fiber lasers, each configured to provide a respective native laser beam having a first wavelength;
    a wavelength converter configured to receive the native laser beams provided by the fiber lasers and convert the native laser beams into a converted laser beam having a second wavelength below the first wavelength; and
    a scanner configured to emit the converted laser beam,
        wherein the fiber lasers include three fiber lasers providing three native laser beams, respectively, and the wavelength of the converted laser beam is determined by $$\frac{1}{\lambda_4} = \frac{1}{\lambda_3} + \frac{1}{\lambda_2} + \frac{1}{\lambda_1}$$

where $\lambda_4$ represents the wavelength of the converted laser beam, and $\lambda_1$, $\lambda_2$, and $\lambda_3$ each represents a respective wavelength of the three native laser beams.

14. The apparatus of claim 13, wherein the wavelength converter comprises:
    a nonlinear optical material configured to perform optical frequency mixing of the native laser beams; and
    a temperature controller configured to set a temperature of the nonlinear optical material based on the wavelength of the converted laser beam.

15. The apparatus of claim 14, wherein the nonlinear optical material includes a nonlinear optical crystal.

16. The apparatus of claim 13, wherein the first wavelength is 1,100 nm.

17. A method for detecting laser light returned from an object, comprising:
- providing, by a plurality of laser sources, a plurality of native laser beams, at least one of the laser beams having a wavelength above 1,100 nm;
- converting, by a wavelength converter, the native laser beams into a converted laser beam having a wavelength below 1,100 nm;
- emitting, by a scanner, the converted laser beam to the object in a first direction; and
- detecting, by a receiver, a returned laser beam having a wavelength below 1,100 nm and returned from the object in a second direction,
  - wherein when the laser sources include two laser sources providing two native laser beams, respectively, the wavelength of the converted laser beam is determined by $$\frac{1}{\lambda_3} = \frac{1}{\lambda_2} + \frac{1}{\lambda_1}$$

where $\lambda_3$ represents the wavelength of the converted laser beam, and $\lambda_1$ $\lambda_2$ each represents a respective wavelength of the two native laser beams.

18. The method of claim 17, wherein converting the native laser beams into the converted laser beam comprises:
- setting, by a temperature controller, a temperature of a nonlinear optical material based on the wavelength of the converted laser beam; and
- performing, by the nonlinear optical material, optical frequency mixing of the native laser beams.

* * * * *